US011667832B2

(12) United States Patent
Saini et al.

(10) Patent No.: US 11,667,832 B2
(45) Date of Patent: Jun. 6, 2023

(54) METHODS OF MAKING NANOPARTICLE COATED PROPPANTS AND USE THEREOF

(71) Applicant: Saudi Arabian Oil Company, Dhahran (SA)

(72) Inventors: Rajesh Kumar Saini, Cypress, TX (US); Mohammad Hamidul Haque, Katy, TX (US); Mohammed Sayed, Houston, TX (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/941,261

(22) Filed: Sep. 9, 2022

(65) Prior Publication Data

US 2023/0074622 A1 Mar. 9, 2023

Related U.S. Application Data

(62) Division of application No. 16/547,839, filed on Aug. 22, 2019, now Pat. No. 11,473,010.

(51) Int. Cl.
*C09K 8/05* (2006.01)
*E21B 43/267* (2006.01)
(Continued)

(52) U.S. Cl.
CPC .............. *C09K 8/805* (2013.01); *C09K 8/665* (2013.01); *C09K 8/685* (2013.01); *E21B 43/267* (2013.01);
(Continued)

(58) Field of Classification Search
None
See application file for complete search history.

(56) References Cited

U.S. PATENT DOCUMENTS 9,434,874 B2  9/2016  Qin et al.
9,442,375 B2  9/2016  Yang et al.
(Continued)

FOREIGN PATENT DOCUMENTS

CN  106967191 A  7/2017
EP  2623579 A1  8/2013
(Continued)

OTHER PUBLICATIONS

Al-Muntasheri et al., "Nanoparticle-Enhanced Hydraulic-Fracturing Fluids: A Review", SPE Production & Operations, pp. 186-195, May 2017.

(Continued)

*Primary Examiner* — Charles R Nold
(74) *Attorney, Agent, or Firm* — Dinsmore & Shohl LLP

(57) ABSTRACT

Producing proppants with nanoparticle proppant coatings includes reacting nanoparticles with at least one of an alkoxysilane solution or a halosilane solution to form functionalized nanoparticles and coating proppant particles with unfunctionalized organic resin, a strengthening agent, and the functionalized nanoparticles to produce the nanoparticle coated proppant. The functionalized nanoparticles include nanoparticles having at least one attached omniphobic moiety including at least a fluoroalkyl-containing group including 1H, 1H, 2H, 2H-perfluorooctylsilane. The strengthening agent comprises at least one of carbon nanotubes, silica, alumina, mica, nanoclay, graphene, boron nitride nanotubes, vanadium pentoxide, zinc oxide, calcium carbonate, or zirconium oxide. Additionally, increasing a rate of hydrocarbon production from a subsurface formation through the use of the nanoparticle coated proppant includes producing a first (Continued)

rate of production of hydrocarbons from the subsurface formation, introducing a hydraulic fracturing fluid into the subsurface formation, and increasing hydrocarbon production by producing a second rate of production of hydrocarbons.

20 Claims, 3 Drawing Sheets

(51) Int. Cl.
  C09K 8/80 (2006.01)
  C09K 8/66 (2006.01)
  C09K 8/68 (2006.01)
(52) U.S. Cl.
  CPC ...... C09K 2208/10 (2013.01); C09K 2208/34 (2013.01)

(56) References Cited

U.S. PATENT DOCUMENTS

| | | | |
|---|---|---|---|
| 9,879,515 | B2 | 1/2018 | Green et al. |
| 2007/0036977 | A1 | 2/2007 | Sinclair et al. |
| 2010/0267594 | A1* | 10/2010 | Rana ............ A61Q 19/00 264/4.32 |
| 2012/0296029 | A1 | 11/2012 | Liu et al. |
| 2012/0322697 | A1 | 12/2012 | Zhang |
| 2015/0252254 | A1 | 9/2015 | Zhang et al. |
| 2016/0076348 | A1 | 3/2016 | Fernandez-Ibanez et al. |
| 2016/0137904 | A1* | 5/2016 | Drake ............ C09K 8/536 507/219 |
| 2017/0121596 | A1 | 5/2017 | Canova et al. |
| 2017/0190961 | A1 | 7/2017 | Nguyen et al. |
| 2020/0231864 | A1 | 7/2020 | Saini et al. |

FOREIGN PATENT DOCUMENTS

| | | |
|---|---|---|
| KR | 20110033705 A | 3/2011 |
| WO | 2015031415 A2 | 3/2015 |
| WO | 2016032417 A1 | 3/2016 |
| WO | 2017136641 A1 | 8/2017 |
| WO | 2018148357 A1 | 8/2018 |

OTHER PUBLICATIONS

Choi et al., "Surface-modified silica colloid for diagnostic imaging", Journal of Colloid and Interface Science, vol. 258, pp. 435-437, 2003.

Chu et al., "Superamphiphobic surfaces", Chem. Soc. Rev., vol. 43, pp. 2784-2798, 2014.

Gottardo et al., "Use of nanomaterials in fluids, proppants, and downhole3 tools for hydraulic fracturing of unconventional hydrocarbon reservoirs", JRC Technical Reports, Nov. 1, 2016.

Li et al., "Nanomaterials-Enhanced Hydrocarbon-Based Well Treatment Fluids", Society of Petroleum Engineers, SPE-189960-MS, 2018.

Negin et al., "Application of nanotechnology for enhancing oil recovery—A review", Petroleum, vol. 2, pp. 324-333, 2016.

Ni et al., "Synthesis of an Amphiphobic Nanofluid with a Novel Structure and Its Wettability Alteration on Low-Permeability Sandstone Reservoirs", American Chemical Society, Energy&Fuels, vol. 32, pp. 4747-4753, 2018.

Nozawa et al., "Smart Control of Monodisperse Stober Silica Parties: Effect of Reactant Addition Rate on Growth Process", Langmuir, Vo9I. 21, pp. 1516-1523, 2005.

Sayed et al., "Novel Surface Modified Nanoparticles for Mitigation of Condensate and Water Blockage in Gas Reservoirs", Society of Petroleum Engineers, SPE-189959-MS, 2018.

Shimura et al., "Preparation of surfactant templated nanoporous silica spherical particles by the Stober method. Effect of solvent composition on the particle size", J. Mater Sci vol. 42, pp. 5299-5306, 2007.

Stober et al., "Controlled Growth of Monodisperse Silica Spheres in the Micron Size Range", Journal of Colloid and Interface Science, vol. 26, pp. 62-69, 1968.

Van Blaaderen et al., "Synthesis and Characterization of Monodisperse Colloidal Organo-silica Spheres", Journal of Colloid and Interface Science, vol. 156, pp. 1-18, 1993.

Wang et al., "Preparation of spherical silica particles by Stober process with high concentration of tetra-ethyl-orthosilicate", Journal of Colloid and Interface Science, vol. 341, pp. 23-29, 2010.

International Search Report and Written Opinion dated Oct. 27, 2020 pertaining to International application No. PCT/US2020/043172 filed Jul. 23, 2020, 14 pgs.

* cited by examiner

METHODS OF MAKING NANOPARTICLE COATED PROPPANTS AND USE THEREOF

CROSS-REFERENCE TO RELATED APPLICATION

This application claims priority to U.S. Non-provisional patent application Ser. No. 16/547,839 filed Aug. 22, 2019, entitled NANOPARTICLE COATED PROPPANTS AND METHODS OF MAKING AND USE THEREOF, the contents of which are hereby incorporated by reference in its entirety.

TECHNICAL FIELD

Embodiments herein generally relate to coated proppants, methods of making and their use in downhole formations.

BACKGROUND

Hydraulic fracturing is a stimulation treatment routinely performed on oil and gas wells. Hydraulic fracturing fluids are pumped into the subsurface formation to be treated, causing fractures to open in the subsurface formation. Proppants, such as grains of sand of a particular size, may be mixed with the treatment fluid to keep the fracture open when the treatment is complete.

SUMMARY

It is often desirable during and after fracturing a subsurface formation to hold the fractures open through the use of proppants for more effective oil and gas production than without. However, sand particles, which are used as a proppant, may not provide sufficient crush resistance for use in a given subsurface formation due to the polycrystalline nature of the grains. Conventional uncoated proppant break under downhole stress. Ceramic proppants break down in wet conditions, which cause them to lose their crush resistance. Temperatures downhole exacerbate this effect.

Proppant coatings are used to protect the proppant particle from degradation by the presence of aqueous fluids at downhole temperatures. The proppant coating increases the surface area of the particle; therefore, the crush stress is distributed over a larger area of the coated proppant particle. In turn, the distribution of force along a larger area should result in a decrease in the amount of crushed proppant particles, also known as 'the crush percentage.' The proppant coating also adheres to the proppant and prevents proppant that is crushed upon application of formation stress from releasing proppant fines. Proppant fines may migrate into the formation and restrict flow conductivity of the formation.

Accordingly, a need exists for a strong, chemically-resistant proppant coating that includes traditional, unfunctionalized organic resin. Using unfunctionalized organic resin in the proppant coating prevents crushing, fines migration, proppant flowback and breakdown of the proppant particle. The dispersion of strengthening agents enhances the mechanical strength of the coating materials. The functionalized nanoparticles in the proppant coating impart hydrophobicity, oleophobicity, or omniphobicity to the proppants without the need for an expensive hydrophobic functionalized resin. The functionalized nanoparticles also provide resistance to the chemicals present in hydraulic fracturing fluid.

According to the subject matter of the present disclosure, a nanoparticle coated proppant including a proppant particle and a nanoparticle proppant coating is disclosed. The nanoparticle proppant coating coats the proppant particle. The nanoparticle proppant coating includes unfunctionalized organic resin, a strengthening agent comprising at least one of carbon nanotubes, silica, alumina, glass, mica, graphite, talc, nanoclay, graphene, carbon nanofibers, boron nitride nanotubes, vanadium pentoxide, zinc oxide, calcium carbonate, zirconium oxide, titanium oxide, silicon nitride, silicon carbide, and aramid fibers, and functionalized nanoparticles adhered to the unfunctionalized organic resin, in which the functionalized nanoparticles comprise nanoparticles having at least one attached hydrophobic moiety, oleophobic moiety, or omniphobic moiety.

In accordance with another embodiment of the present disclosure, a method for producing nanoparticle coated proppant with a nanoparticle proppant coating is disclosed. The method includes reacting nanoparticles with at least one of an alkoxysilane solution and a halosilane solution to form functionalized nanoparticles, in which functionalized nanoparticles comprise nanoparticles having fluorosilane, perfluorosilane or alkylsilane moieties attached to the nanoparticles. The method further includes coating proppant particles with unfunctionalized organic resin, strengthening agent, and the functionalized nanoparticles to produce nanoparticle coated proppants with nanoparticle proppant coating.

BRIEF DESCRIPTION OF THE DRAWINGS

The following detailed description of specific embodiments of the present disclosure can be best understood when read in conjunction with the following drawing, where like structure is indicated with like reference numerals and in which.

DETAILED DESCRIPTION

Figure 1:
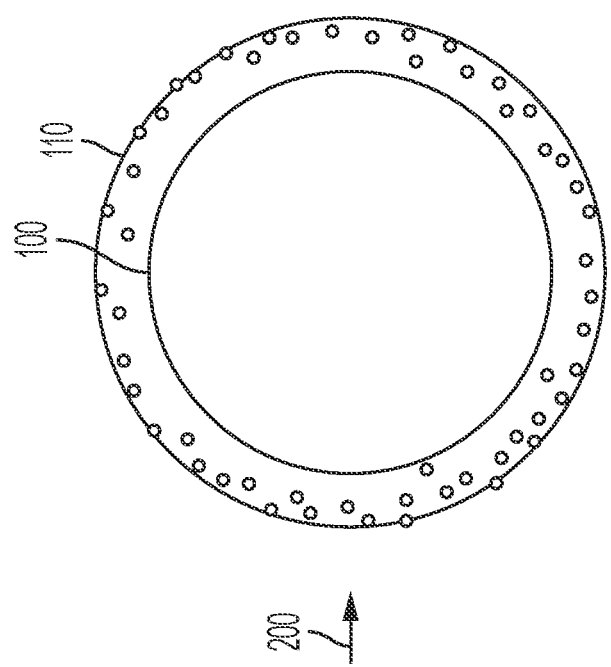
FIG. 1 is a schematic view of a proppant particle and a nanoparticle coated proppant, according to one or more embodiments described in this disclosure.
Figure 1:
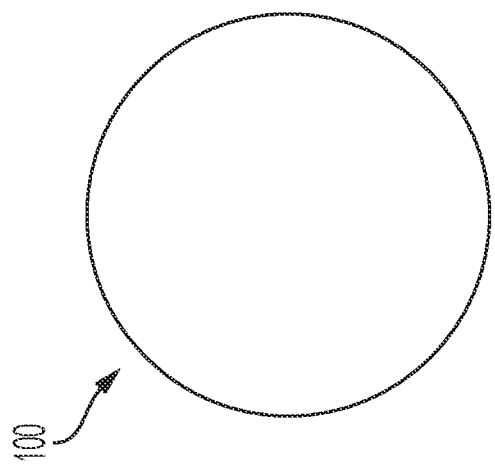

As used throughout this disclosure, the term "condensate" refers to a liquid hydrocarbon phase that generally occurs in association with natural gas. Its presence as a liquid phase depends on temperature and pressure conditions in the reservoir allowing condensation of liquid from vapor. The production of condensate reservoirs can be complicated, because of the pressure sensitivity of some condensates. During production, there is a risk of the condensate changing from gas to liquid if the reservoir pressure reduces to less than the dew point during production. Hydrocarbon gas produced in association with condensate is called wet gas. The API gravity of condensate is typically from 50° to 120°.

As used throughout this disclosure, the term "condensate banking" refers to a relative permeability effect where condensate drops out of the vapor phase around the wellbore when the pressure reduces to less than the dew point in response to drawdown or depletion. Gas production rate may be hindered by the permeability reduction.

As used throughout this disclosure, the term "hierarchical roughness" refers to micro roughness covered with nano roughness. This differs from unitary roughness as the material is not solely micro roughness or nano roughness, but a combination of the two.

As used throughout this disclosure, the term "hydraulic fracturing" refers to a stimulation treatment routinely performed on hydrocarbon wells in reservoirs with a permeability of less than 10 milliDarcys. Hydraulic fracturing fluids are pumped into a subsurface formation, causing a fracture to form or open. The wings of the fracture extend away from the wellbore in opposing directions according to the natural stresses within the subsurface formation. Proppants are mixed with the treatment fluid to keep the fracture open when the treatment is complete. Hydraulic fracturing creates fluid communication with a subsurface formation and bypasses damage, such as condensate banking, that may exist in the near-wellbore area.

As used throughout this disclosure, the term "subsurface formation" refers to a body of rock that is sufficiently distinctive and continuous from the surrounding rock bodies that the body of rock can be mapped as a distinct entity. A subsurface formation is, therefore, sufficiently homogenous to form a single identifiable unit containing similar rheological properties throughout the subsurface formation, including, but not limited to, porosity and permeability. A subsurface formation is the fundamental unit of lithostratigraphy.

As used throughout this disclosure, the term "lithostatic pressure" refers to the pressure of the weight of overburden, or overlying rock, on a subsurface formation.

As used throughout this disclosure, the term "producing subsurface formation" refers to the subsurface formation from which hydrocarbons are produced.

As used throughout this disclosure, the term "proppants" refers to particles mixed with hydraulic fracturing fluid to hold fractures open after a hydraulic fracturing treatment. Proppant materials are carefully sorted for mesh size, roundness and sphericity to provide an efficient conduit for fluid production from the reservoir to the wellbore.

As used throughout this disclosure, the term "reservoir" refers to a subsurface formation having sufficient porosity and permeability to store and transmit fluids.

As used throughout this disclosure, the term "unfunctionalized" refers to a material that is not functionalized; that is, the material does not have a functional group added to it. A functional group is a specific grouping of elements that is characteristic of a class of compounds, and determines some properties and reactions of that class. Therefore, an unfunctionalized material does not have a functional group or moiety added to it to provide that material with specific properties.

As used throughout this disclosure, the term "strengthening agent" refers to a reinforcing agent that enhances the mechanical strength of the nanoparticle proppant coating and provides resistance to chemicals used in hydraulic fracturing fluid. Examples of "strengthening agent" refers to at least one of, but not limited to, carbon nanotubes, silica, alumina, glass, mica, graphite, talc, nanoclay, graphene, carbon nanofibers, boron nitride nanotubes, vanadium pentoxide, zinc oxide, calcium carbonate, zirconium oxide, titanium oxide, silicon nitride, silicon carbide, and aramid fibers.

As used throughout this disclosure, the term "wings" refers to the two cracks formed by a fracture being 180° apart and typically similar in shape and size.

As used throughout this disclosure, the term "wellbore" refers to the drilled hole or borehole, including the openhole or uncased portion of the well. Borehole may refer to the inside diameter of the wellbore wall, the rock face that bounds the drilled hole.

To produce hydrocarbons from a hydrocarbon-containing reservoir, production wells are drilled to a depth that enables hydrocarbons to travel from the subsurface formation to the surface. However, when producing hydrocarbon gas, the wellbore and subsurface formation pressure decrease as the volume of hydrocarbon gas in the reservoir decreases. If pressure reduces to less than the dew point of the hydrocarbon gas, condensate may form and create a liquid blockage. This liquid blockage decreases the permeability between the wellbore and the subsurface formation, and thereby decreasing the rate of production of the hydrocarbon gas.

The present disclosure is directed to compositions and methods for producing proppants with a nanoparticle proppant coating, to hydraulic fracturing fluids including proppants, and to methods for increasing a rate of hydrocarbon production from a subsurface formation through the use of proppants with nanoparticle proppant coating. The proppant comprises a proppant particle and a nanoparticle proppant coating. The nanoparticle proppant coating includes unfunctionalized organic resin, a strengthening agent, and functionalized nanoparticles adhered to the resin or mixed within the resin. The nanoparticle proppant coating coats the proppant particle. The strengthening agent and the functionalized nanoparticles may be uniformly distributed within the unfunctionalized organic resin. In other embodiments, the nanoparticle proppant coating may include the unfunctionalized organic resin as a separate layer from functionalized nanoparticles, such as the functionalized nanoparticles arranged proximate an outer surface of the unfunctionalized organic resin. These layers may be of uniform thickness or may comprise changes in thickness throughout, leading to hierarchical roughness in the nanoparticle proppant coating. The hierarchical structure is formed by the space between the nano-particles coating the surface. This hierarchical roughness makes the nanoparticle proppant coating increases the hydrophobicity, oleophobicity, or omniphobicity thereby mitigating condensate banking, preventing water block formation, increasing oil and gas production, and preventing degradation of the nanoparticle proppant coating.

As previously disclosed, the strengthening agent enhances the mechanical strength of the nanoparticle proppant coating and provides resistance to chemicals used in hydraulic fracturing fluid. Among other benefits, the functionalized nanoparticles impart hydrophobic or oleophobic characteristics to the nanoparticle proppant coating. This reduces the interfacial tension and prevents condensate or water blockage in the wellbore, increasing gas relative permeability and thereby reducing condensate banking. Furthermore, hydrophobic characteristics mean that water will not wet the surface, which decreases the degradation of the proppant due to contact with water. These wettability characteristics enhance the load recovery of hydraulic fracturing fluid or water after fracturing operations as the hydrocarbons will experience less friction from contact with the proppants. This increases the rate of hydrocarbon production and the overall amount of hydrocarbon production.

FIG. 1 schematically portrays two states of a proppant particle 100. On the left, a proppant particle 100 is depicted in a first, uncoated state. Then, on the right, a nanoparticle coated proppant is depicted in which the proppant particle 100 is in a second, coated state. In the second state, the proppant particle 100 has undergone a coating step 200 to be coated with a nanoparticle proppant coating 110, forming a nanoparticle coated proppant.

The proppant particle may be chosen from any type of proppant suitable for use in hydraulic fracturing applications. As previously described, proppants are propping agent particles used in hydraulic fracturing fluids to maintain and hold open subsurface fractures during or following subsurface treatment. In some embodiments, the proppant particle may comprise particles of materials such as inorganic oxides, silicates, sand, alumina, bauxite, silica, ceramic, thermoset resins, resin, epoxy, plastic, mineral, glass, silicon carbide, silicon nitride, zirconia, walnut hulls, composites of resin and other minerals or combinations thereof. For instance, the proppant particle may comprise graded sand, treated sand, ceramic, or plastic. The proppant particle may comprise particles of bauxite, sintered bauxite, $Ti^{4+}$/polymer composites, where the superscript "4+" stands for the oxidation state of titanium, titanium nitride (TiN), or titanium carbide. The proppant particle may comprise glass particles or glass beads. Embodiments of the present disclosure may utilize at least one proppant particle and in embodiments in which more than one proppant particle is used, the proppant particles may contain a mixture of two or more different materials.

The material of the proppant particle may be chosen based on the particular application and characteristics desired, such as the depth of the subsurface formation in which the proppant particles will be used, as proppant particles with greater mechanical strength are needed at greater lithostatic pressures. For instance, ceramic proppant materials exhibit greater strength, thermal resistance, and conductivity than sands. Additionally, ceramic proppant materials have more uniform size and shape than sands. Fully (pre-cured) or partially cured (curable) unfunctionalized organic resin-coated sand may be chosen in embodiments to provide sand particles of irregular size and shape with greater crush resistance strength and conductivity.

The proppant particle may include various sizes or shapes. In some embodiments, the one or more proppant particles may have sizes from 8 mesh to 140 mesh (diameters from 106 micrometers (μm) to 2.36 millimeters (mm)). In some embodiments, the proppant particles may have sizes from 8 mesh to 16 mesh (diam. 2380 μm to 1180 μm), 16 mesh to 30 mesh (diam. 600 μm to 1180 μm), 20 mesh to 40 mesh (diam. 420 μm to 840 μm), 30 mesh to 50 mesh (diam. 300 μm to 600 μm), 40 mesh to 70 mesh (diam. 212 μm to 420 μm) or 70 mesh to 140 mesh (diam. 106 μm to 212 μm). The sphericity and roundness of the proppant particles may also vary based on the desired application.

In some embodiments, the proppant particles may have a rough surface texture that may increase adhesion of the nanoparticle proppant coating to the proppant particle. The proppant particles surfaces may be roughened to increase the surface area of the proppant particle by any suitable physical or chemical method, including, for example, using an appropriate etchant. In some embodiments, the proppant particle may have a surface that provides a desired adhesion of the nanoparticle proppant coating to the proppant particle or may already be sufficiently rough without a need for chemical or physical roughening. Specifically, ball milling proppant particles may provide relatively rounder particles as well as particles with increased surface roughness.

The term "rough" refers to a surface having at least one deviation from the normalized plane of the surface, such as a depression or protrusion. The surface may be uneven and irregular and may have one or more imperfections, such as dimples, stipples, bumps, projections or other surface defects. The rough surface may have an arithmetic average roughness ($R_a$) of greater than or equal to 1 nanometer (nm) (1 nm=0.001 μm). $R_a$ is defined as the arithmetic average of the differences between the local surface heights and the average surface height and can be described by Equation 1, contemplating n measurements:

$$R_a = \frac{1}{n}\sum_{i=1}^{n}|y_i|$$ EQUATION 1

In Equation 1, each $y_i$ is the amount of deviation from the normalized plane of the surface (meaning the depth or height of a depression or protrusion, respectively) of the absolute value of the ith of n measurements. Thus, $R_a$ is the arithmetic average of the absolute values of n measurements of deviation y from the normalized plane of the surface. In some embodiments, the surface of the proppant particle may have an $R_a$ of greater than or equal to 2 nm (0.002 μm), or greater than or equal to 10 nm (0.01 μm), or greater than or equal to 50 nm (0.05 μm), or greater than or equal to 100 nm (0.1 μm), or greater than or equal to 1 μm.

As previously discussed in this disclosure, the nanoparticle proppant coating comprises unfunctionalized organic resin, a strengthening agent, and functionalized nanoparticles. Unfunctionalized organic resin is a substance of plant or synthetic origin that is typically convertible into polymers, and may be a mixture of organic compounds such as terpenes, an organic compound produced by plants. The viscosity of resin may be greater than 20 centiPoise (cP), measured at a temperature of 120° C. In one embodiment, the unfunctionalized organic resin may have no additional additives. The unfunctionalized organic resin may comprise at least one of phenolic resin, epoxy resin, furan resin, polyurethane resin, polyurea resin, polyester, polyamide-imide resin, polyamide resin polyurea/polyurethane resin, urea-formaldehyde resin, melamine resin, silicone resin and vinyl ester resin and mixture thereof. The unfunctionalized organic resin may comprise phenol-formaldehyde. The phenol-formaldehyde resin may comprise novolac or resole. Novolacs are phenol-formaldehyde resins with a formaldehyde to phenol molar ratio of less than 1, where the phenol units are mainly linked by methylene or ether groups, or both. The novolac polymer may have a molecular weight of from 1,000 to 100,000 grams per mole (g/mol), from 1,000 to 50,000 g/mol, from 1,000 to 25,000 g/mol, from 1,000 to 10,000 g/mol, from 1,000 to 5,000 g/mol, 5,000 to 100,000 g/mol, from 5,000 to 50,000 g/mol, from 5,000 to 25,000 g/mol, from 5,000 to 10,000 g/mol, 10,000 to 100,000 g/mol, from 10,000 to 50,000 g/mol, from 10,000 to 25,000 g/mol, from 25,000 to 50,000 g/mol, from 25,000 to 100,000 g/mol, or from 50,000 to 100,000 g/mol. The novolac polymer comprises a glass transition temperature greater than 250° F., 300° F., 350° F., 390° F., 400° F., 450° F., or 500° F. Novolacs are stable, meaning that novolacs do not react and do retain their polymer properties at temperatures of up to 300° F., 400° F., 425° F., 450° F., 475° F., 500° F., 550° F., or 600° F. Resoles are phenol-formaldehyde resins with a formaldehyde to phenol molar ratio of more than 1, where the phenol units are mainly linked by methylene or ether groups, or both. This can harden without the addition of a crosslinking agent due to abundance of methylene to bridge the phenol groups. The resole may have a molecular weight of from 1,000 to 100,000 grams per mole (g/mol), from 1,000 to 50,000 g/mol, from 1,000 to 25,000 g/mol, from 1,000 to 10,000 g/mol, from 1,000 to 5,000 g/mol, 5,000 to 100,000 g/mol, from 5,000 to 50,000 g/mol, from 5,000 to 25,000 g/mol, from 5,000 to 10,000 g/mol, 10,000 to 100,000 g/mol, from 10,000 to 50,000 g/mol, from 10,000 to 25,000 g/mol, from 25,000 to 50,000 g/mol, from 25,000 to 100,000 g/mol, or from 50,000 to 100,000 g/mol.

As previously discussed in this disclosure, the functionalized nanoparticles comprise nanoparticles of at least one of nanosilica, nanoalumina, nanozinc oxide, nanotubes, carbon nanotubes, nanocalcium carbonate, mica, vanadium pentoxide, boron nitride nanotubes, nanozirconium oxide, nanotitanium oxide, nano clay, nanobarium oxide, nanoboron oxide, and combinations thereof. The functionalized nanoparticles may comprise nanosilica nanoparticles. Nanosilica particles may be formed according to the process described in the examples and may have a particle size of from 2 to 500 nm. Furthermore, the strengthening agent comprises nano or micro fibers and particles. The strengthening agent comprises at least one of but not limited to carbon nanotubes, silica, alumina, glass, mica, graphite, talc, nanoclay, graphene, carbon nanofibers, boron nitride nanotubes, vanadium pentoxide, zinc oxide, calcium carbonate, zirconium oxide, titanium oxide, silicon nitride, silicon carbide, and aramid fibers. The strengthening agent may comprise carbon nanotubes. Carbon nanotubes comprise at least one of single-walled nanotubes, double-walled nanotubes, multi-walled carbon nanotubes, narrow-walled nanotubes, or bundle of nanotubes. The carbon nanotubes have a diameter of from 1 to 200 nm, from 20 to 100 nm, from 10 to 80 nm, from 4 to 20 nm, from 2 to 12 nm, from 2 to 10 nm, from 2 to 9 nm, from 2 to 8 nm, from 2 to 7 nm, from 2 to 6 nm, from 2 to 5 nm, from 2 to 4 nm, from 2 to 3 nm, 3 to 12 nm, from 3 to 10 nm, from 3 to 9 nm, from 3 to 8 nm, from 3 to 7 nm, from 3 to 6 nm, from 3 to 5 nm, from 3 to 4 nm, 4 to 12 nm, from 4 to 10 nm, from 4 to 9 nm, from 4 to 8 nm, from 4 to 7 nm, from 4 to 6 nm, from 4 to 5 nm, 5 to 12 nm, from 5 to 10 nm, from 5 to 9 nm, from 5 to 8 nm, from 5 to 7 nm, from 5 to 6 nm, 6 to 12 nm, from 6 to 10 nm, from 6 to 9 nm, from 6 to 8 nm, from 6 to 7 nm, 7 to 12 nm, from 7 to 10 nm, from 7 to 9 nm, from 7 to 8 nm, 8 to 12 nm, from 8 to 10 nm, from 8 to 9 nm, 9 to 12 nm, from 9 to 10 nm, from 10 to 12 nm, or of 8 nm; a length of from 20 to 500 μm, 20 to 200 μm, 20 to 150 μm, 20 to 100 μm, 50 to 500 μm, from 50 to 200 μm, from 50 to 150 μm, from 50 to 100 μm, from 100 to 500 μm, from 100 to 200 μm, from 100 to 150 μm, from 150 to 500 μm, from 150 to 200 μm, or from 200 to 500 μm; an aspect ratio (calculated by dividing the length of the carbon nanotube by the diameter of the carbon nanotube) of from 100 to 50,000, from 500 to 30,000, from 1,000 to 20,000, from 1,000 to 100,000, from 1,000 to 50,000, from 1,000 to 40,000, from 1,000 to 30,000, from 1,000 to 25,000, from 1,000 to 20,000, from 1,000 to 15,000, from 1,000 to 12,000, from 1,000 to 10,000, from 1,000 to 8,000, from 8,000 to 100,000, from 8,000 to 50,000, from 8,000 to 40,000, from 8,000 to 30,000, from 8,000 to 25,000, from 8,000 to 20,000, from 8,000 to 15,000, from 8,000 to 12,000, from 8,000 to 10,000, from 10,000 to 100,000, from 10,000 to 50,000, from 10,000 to 40,000, from 10,000 to 30,000, from 10,000 to 25,000, from 10,000 to 20,000, from 10,000 to 15,000, from 10,000 to 12,000, from 12,000 to 100,000, from 12,000 to 50,000, from 12,000 to 40,000, from 12,000 to 30,000, from 12,000 to 25,000, from 12,000 to 20,000, from 12,000 to 15,000, from 15,000 to 100,000, from 15,000 to 50,000, from 15,000 to 40,000, from 15,000 to 30,000, from 15,000 to 25,000, from 15,000 to 20,000, from 20,000 to 100,000, from 20,000 to 50,000, from 20,000 to 40,000, from 20,000 to 30,000, from 20,000 to 25,000, from 25,000 to 100,000, from 25,000 to 50,000, from 25,000 to 40,000, from 25,000 to 30,000, from 30,000 to 100,000, from 30,000 to 50,000, from 30,000 to 40,000, from 40,000 to 50,000, from 40,000 to 100,000, or from 50,000 to 100,000; and a specific surface area of from 100 to 12,000 square meter per gram ($m^2/g$), from 100 to 10,000 $m^2/g$, from 100 to 800 $m^2/g$, from 100 to 700 $m^2/g$, from 400 to 12,000 $m^2/g$, from 400 to 10,000 $m^2/g$, from 400 to 800 $m^2/g$, from 100 to 1,500 $m^2/g$, from 120 to 1,000 $m^2/g$, from 150 to 850 $m^2/g$, or from 400 to 700 $m^2/g$, where the specific surface area is calculated through the Brunauer-Emmett-Teller (BET) theory. The multi-walled carbon nanotubes comprise a metal oxide percentage of 10 weight percent (wt. %) or less, 5 wt. % or less, 3 wt. % or less, 2 wt. % or less, 1.5 wt. % or less, 1 wt. % or less, or 0.5 wt. % or less; and a bulk density of from 0.001 to 0.12 grams per cubic centimeter ($g/cm^3$), from 0.01 to 0.08 $g/cm^3$, from 0.02 to 0.06 $g/cm^3$, from 0.01 to 1 $g/cm^3$, from 0.01 to 0.5 $g/cm^3$, from 0.01 to 0.2 $g/cm^3$, from 0.01 to 0.1 $g/cm^3$, from 0.01 to 0.05 $g/cm^3$, from 0.01 to 0.02 $g/cm^3$, from 0.02 to 1 $g/cm^3$, from 0.02 to 0.5 $g/cm^3$, from 0.02 to 0.2 $g/cm^3$, from 0.02 to 0.1 $g/cm^3$, from 0.02 to 0.05 $g/cm^3$, from 0.05 to 1 $g/cm^3$, from 0.05 to 0.5 $g/cm^3$, from 0.05 to 0.2 $g/cm^3$, from 0.05 to 0.1 $g/cm^3$, from 0.06 to 0.08 $g/cm^3$, from 0.1 to 1 $g/cm^3$, 0.1 to 0.5 $g/cm^3$, from 0.1 to 0.2 $g/cm^3$, from 0.2 to 1 $g/cm^3$, from 0.2 to 0.5 $g/cm^3$, or from 0.5 to 1 $g/cm^3$.

The nanoparticle proppant coating may comprise less than or equal to 5 wt. %, 2 wt. %, 1.5 wt. %, 1 wt. %, 0.75 wt. %, 0.5 wt. %, 0.2 wt. %, or 0.1 wt. % of the strengthening agent. Each proppant may comprise from 0.1 to 10 wt. %, from 0.1 to 5 wt. %, from 0.1 to 3 wt. %, from 0.1 to 2 wt. %, from 0.1 to 1.5 wt. %, from 0.1 to 1 wt. %, from 0.1 to 0.5 wt. %, from 0.1 to 0.2 wt. %, 0.2 to 10 wt. %, from 0.2 to 5 wt. %, from 0.2 to 3 wt. %, from 0.2 to 2 wt. %, from 0.2 to 1.5 wt. %, from 0.2 to 1 wt. %, from 0.2 to 0.5 wt. %, from 0.5 to 10 wt. %, from 0.5 to 5 wt. %, from 0.5 to 3 wt. %, from 0.5 to 2 wt. %, from 0.5 to 1.5 wt. %, from 0.5 to 1 wt. %, from 1 to 10 wt. %, from 1 to 5 wt. %, from 1 to 3 wt. %, from 1 to 2 wt. %, from 1 to 1.5 wt. %, from 1.5 to 10 wt. %, from 1.5 to 5 wt. %, from 1.5 to 3 wt. %, from 1.5 to 2 wt. %, from 2 to 10 wt. %, from 2 to 5 wt. %, from 2 to 3 wt. %, from 3 to 10 wt. %, from 3 to 5 wt. %, or from 5 to 10 wt. % strengthening agent as calculated by a weight of the unfunctionalized organic resin.

The nanoparticle proppant coating may comprise less than or equal to 5 wt. %, 2 wt. %, 1.5 wt. %, 1 wt. %, 0.75 wt. %, 0.5 wt. %, 0.2 wt. %, or 0.1 wt. % of the functionalized nanoparticles. Each proppant may comprise from 0.1 to 10 wt. %, from 0.1 to 5 wt. %, from 0.1 to 3 wt. %, from 0.1 to 2 wt. %, from 0.1 to 1.5 wt. %, from 0.1 to 1 wt. %, from 0.1 to 0.5 wt. %, from 0.1 to 0.2 wt. %, 0.2 to 10 wt. %, from 0.2 to 5 wt. %, from 0.2 to 3 wt. %, from 0.2 to 2 wt. %, from 0.2 to 1.5 wt. %, from 0.2 to 1 wt. %, from 0.2 to 0.5 wt. %, from 0.5 to 10 wt. %, from 0.5 to 5 wt. %, from 0.5 to 3 wt. %, from 0.5 to 2 wt. %, from 0.5 to 1.5 wt. %, from 0.5 to 1 wt. %, from 1 to 10 wt. %, from 1 to 5 wt. %, from 1 to 3 wt. %, from 1 to 2 wt. %, from 1 to 1.5 wt. %, from 1.5 to 10 wt. %, from 1.5 to 5 wt. %, from 1.5 to 3 wt. %, from 1.5 to 2 wt. %, from 2 to 10 wt. %, from 2 to 5 wt. %, from 2 to 3 wt. %, from 3 to 10 wt. %, from 3 to 5 wt. %, or from 5 to 10 wt. % functionalized nanoparticles as calculated by a weight of the unfunctionalized organic resin.

The functionalized nanoparticles comprise nanoparticles having at least one attached hydrophobic moiety, oleophobic moiety, or omniphobic moiety. This hydrophobic moiety, oleophobic moiety, or omniphobic moiety acts as a hydrophobic, oleophobic, or omniphobic group and imparts a low surface energy upon the nanoparticles. The hydrophobic moiety, oleophobic moiety, or omniphobic moiety may contain at least one of a fluoroalkyl-containing group or a perfluoroalkyl-containing group. The method includes reacting nanoparticles with at least one of alkoxysilanes or halosilanes containing hydrophobic, oleophobic, or omniphobic groups to form the functionalized nano-particles with low surface energy. The nanoparticles may also be functionalized to have a low surface energy through a fluorine-containing group, a perfluoro-containing group, an organic silicon-containing group, a long chain linear or branched hydrocarbon containing group, an alkyl containing group, an aromatic containing group, or combinations thereof. These groups may be hydrophobic, oleophobic, or omniphobic groups. The hydrocarbon chain length may include more than 5, 7, 9, 10, 12, 14, 15, or 20 carbons. The hydrophobic moiety, oleophobic moiety, or omniphobic moiety of the functionalized nanoparticles may originate from alkoxysilane or a halosilane containing a hydrophobic or omniphobic group. A halosilane is any halogen-substituted silane with at least one of alkyl-containing, fluoroalkyl-containing, perfluoroalkyl-containing, organosilane-containing, or aromatic-containing groups. The halosilane may comprise at least one of fluorine, chlorine, bromine or iodine attached to a silane group. One nonlimiting example of a halosilane with a fluoroalkyl group is trichloro(1H, 1H, 2H, 2H-perfluorooctyl)silane.

Figure 2A:
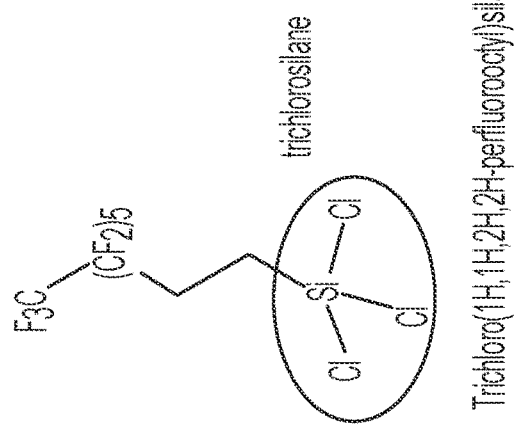
FIG. 2A illustrates a chemical reaction, according to one or more embodiments described in this disclosure.
Figure 2B:
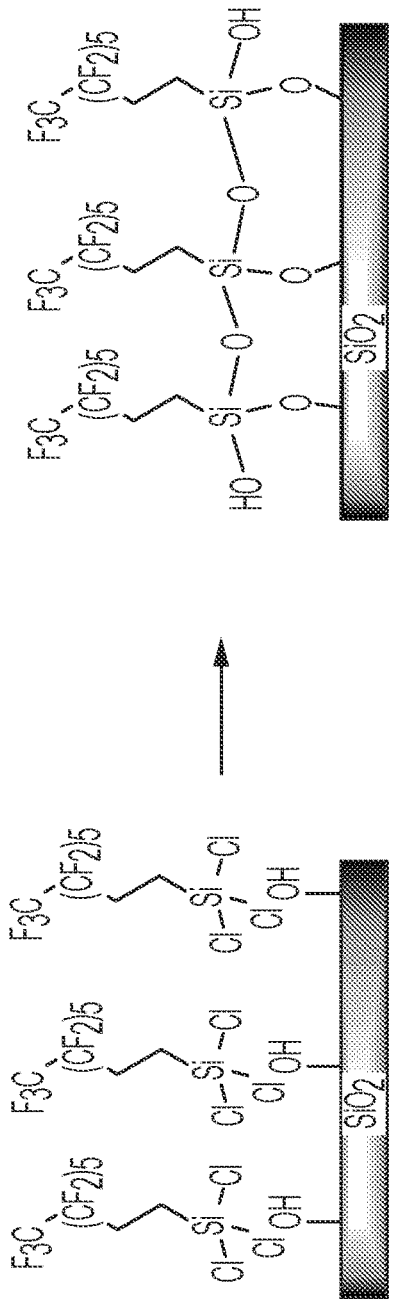
FIG. 2B illustrates a chemical reaction, according to one or more embodiments described in this disclosure.

The functionalized nanoparticles are formed by reaction with at least one of alkoxysilanes and halosilanes comprising hydrophobic moiety, oleophobic moiety, or omniphobic moiety. The alkoxysilanes bond to the surface silanol groups of silica nanoparticles, forming a 1-3 Si—O—Si link in a condensation reaction with elimination of an alcohol. The halosilanes hydrolyze, substituting the halogen group for an alcohol group, which then undergoes a condensation reaction with surface silanol groups, functionalizing the nanoparticles with low surface energy moiety. This reaction is illustrated in FIGS. 2A and 2B. Although the figures include trichlorosilanes, other halogens may be used in place of the chlorine, such as bromine.

Figure 3:
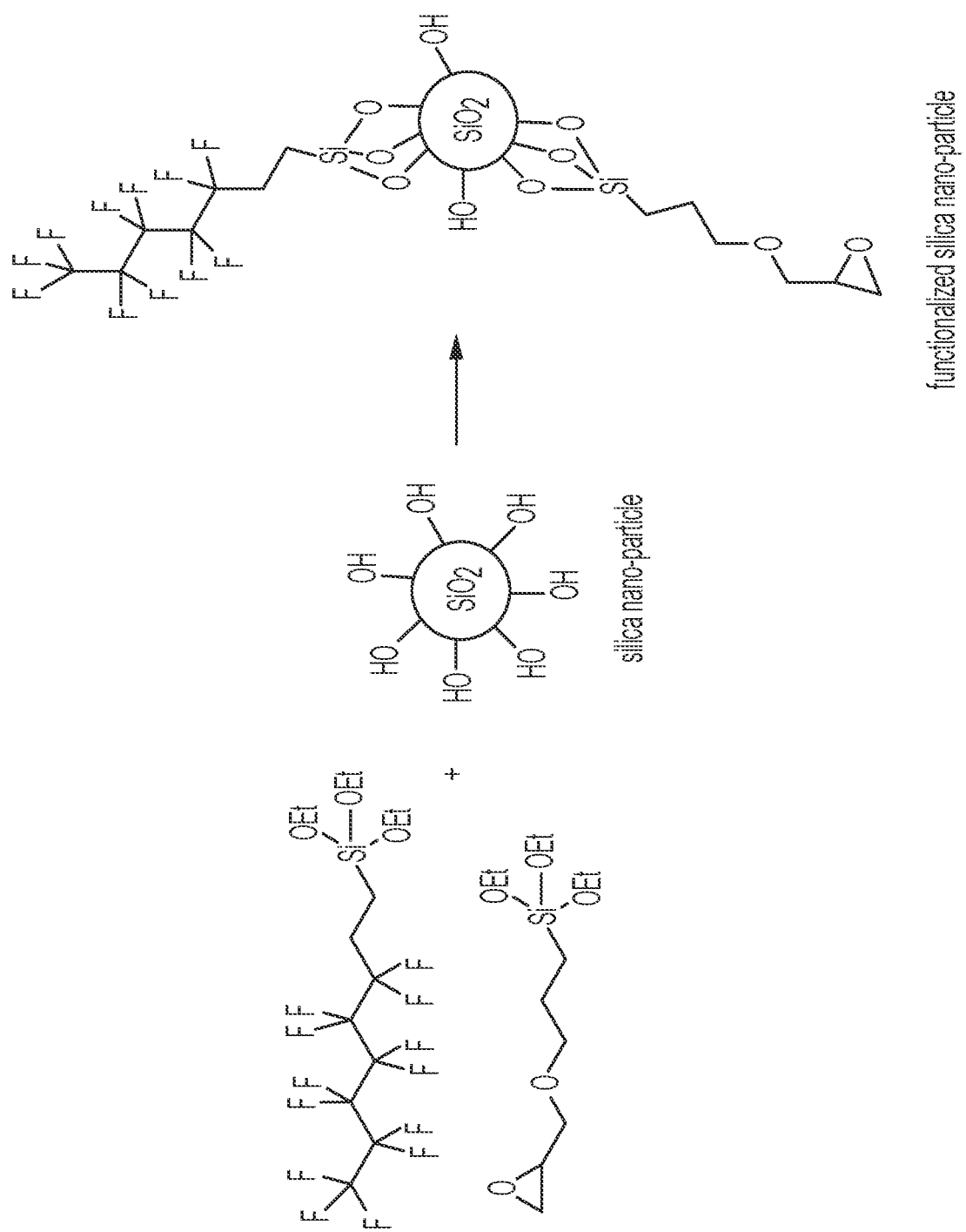
FIG. 3 illustrates a reaction forming a functionalized silica nanoparticle, according to one or more embodiments described in this disclosure.

In some embodiments, the nanoparticles may be further functionalized with a coupling agent. One end of the coupling agent will bind to the nanoparticles while the other end will bind to the unfunctionalized organic resin, thereby bonding the functionalized nanoparticles to the unfunctionalized organic resin. The terminal binding group may include at least one of an epoxy group, an amine group, methyacryloxy group, acrylamide group, aminophenyl group, carboxyl group, halogen group, hydroxyl group, isocynate group, mercapto group, allyl group or a silane ester group that reacts with the nanoparticles and binds with the unfunctionalized organic resin or reacts with the unfunctionalized organic resin to form a bond. In some embodiments, the epoxy containing composition is an epoxysilane with a terminal epoxy group. In some embodiments, the epoxy-containing composition is an alkoxysilane. In some embodiments, the epoxy-containing composition is a silane coupling compound with a terminal reactive group. Examples of silane coupling compound with terminal reactive groups includes but not limited to γ-glycidoxypropyl-triethoxysilane, γ-aminopropyltriethoxysilane, γ-(methacryloxy)propyl trimethoxysilane, 3-acrylamidopropyltrimethoxysilane, 4-aminobutryltriethoxysilane, p-aminophenyltrimethoxysilane, carboxyethylsilanetriol sodium, 4-bromobutyltrimethoxysilane, 2-(chloromethyl)allyltrimethoxysilane, hydroxymethyltriethoxysilane, 3-isocyanotopropyltrimethoxysilane, 3-mer- captopropyltrimethoxysilane and allyltrimethoxysilane. The terminal group on nanoparticles are added to react with various unfunctionalized organic resin systems such as phenolic resin, epoxy resin, furan resin, polyurethane resin, polyurea resin, polyester, polyimide-imide resin, polyimide resin polyurea/polyurethane resin, urea-formaldehyde resin, melamine resin, silicone resin and vinyl ester resin. FIG. 3 illustrates a nonlimiting example of an epoxy terminal binding group on the functionalized nanoparticle.

The functionalized nanoparticles comprise low surface energy, which may be less than 50 milliJoules per square meter ($mJ/m^2$), less than 40 $mJ/m^2$, less than 38 $mJ/m^2$, less than 37 $mJ/m^2$, less than 36 $mJ/m^2$, less than 35 $mJ/m^2$, less than 33 $mJ/m^2$, less than 31 $mJ/m^2$, less than 30 $mJ/m^2$, less than 29 $mJ/m^2$, less than 25 $mJ/m^2$, less than 20 $mJ/m^2$, less than 18 $mJ/m^2$, less than 15 $mJ/m^2$, less than 10 $mJ/m^2$, or less than 5 $mJ/m^2$.

Each proppant comprises from 0.5 to 20 wt. %, from 0.5 to 15 wt. %, from 0.5 to 10 wt. %, from 0.5 to 8 wt. %, from 0.5 to 6 wt. %, from 0.5 to 5 wt. %, from 0.5 to 4.5 wt. %, from 0.5 to 2 wt. %, from 0.5 to 1 wt. %, 1 to 20 wt. %, from 1 to 15 wt. %, from 1 to 10 wt. %, from 1 to 8 wt. %, from 1 to 6 wt. %, from 1 to 5 wt. %, from 1 to 4.5 wt. %, from 1 to 2 wt. %, 2 to 20 wt. %, from 2 to 15 wt. %, from 2 to 10 wt. %, from 2 to 8 wt. %, from 2 to 6 wt. %, from 2 to 5 wt. %, from 2 to 4.5 wt. %, 1 to 2 wt. %, 4.5 to 20 wt. %, from 4.5 to 15 wt. %, from 4.5 to 10 wt. %, from 4.5 to 8 wt. %, from 4.5 to 6 wt. %, from 4.5 to 5 wt. %, 5 to 20 wt. %, from 5 to 15 wt. %, from 5 to 10 wt. %, from 5 to 8 wt. %, from 5 to 6 wt. %, 8 to 20 wt. %, from 8 to 15 wt. %, from 8 to 10 wt. %, from 10 to 15 wt. %, from 10 to 20 wt. %, or from 15 to 20 wt. % unfunctionalized organic resin as calculated by a weight of the proppant particle.

The nanoparticle proppant coating may further comprise a tracer material. Suitable tracer materials may include, but are not limited to, ionic contrast agents such as thorium dioxide ($ThO_2$), iridium-192, antimony-124, scandium-46, gold-198, barium sulfate ($BaSO_4$), diatrizoate, metrizoate, iothalamate, and ioxaglate; and non-ionic contrast agents such as iopamidol, iohexol, ioxilan, iopromide, iodixanol, and ioversol. Furthermore, the tracer material may be present in a range of from 0.001 to 5.0 wt. %, from 0.001 to 3 wt. %, from 0.001 to 1 wt. %, from 0.001 to 0.5 wt. %, from 0.001 to 0.1 wt. %, from 0.005 wt. %, from 0.005 to 5.0 wt. %, from 0.005 to 3 wt. %, from 0.005 to 1 wt. %, from 0.005 to 0.5 wt. %, from 0.005 to 0.1 wt. %, from 0.01 to 5.0 wt. %, from 0.01 to 3 wt. %, from 0.01 to 1 wt. %, from 0.01 to 0.5 wt. %, from 0.5 to 5.0 wt. %, from 0.5 to 3 wt. %, from 0.5 to 1 wt. %, from 1 to 5.0 wt. %, from 1 to 3 wt. %, or from 3 to 5 wt. % as calculated by a weight of the unfunctionalized organic resin.

The nanoparticle proppant coating may further comprise a coupling agent. A coupling agent is a compound that provides a chemical bond between two dissimilar materials, such as an inorganic material and an organic material. The coupling agent may form a bond between the nanoparticle and the unfunctionalized organic resin. In some embodiments, the coupling agent may comprise at least one of γ-glycidoxypropyltriethoxysilane, γ-aminopropyltriethoxysilane, γ-(methacryloxy)propyltrimethoxysilane, 3-acrylamidopropyltrimethoxysilane, 4-aminobutryltriethoxysilane, p-aminophenyltrimethoxysilane, carboxyethylsilanetriol sodium, 4-bromobutyltrimethoxysilane, 2-(chloromethyl)allyltrimethoxysilane, hydroxymethyltriethoxysilane, 3-isocyanotopropyltrimethoxysilane, 3-mercaptopropyltrimethoxysilane, or allyltrimethoxysilane. In some embodiments, the coupling agent may comprise at least one of 3-glycidoxypropyltrimethoxysilane, 3-aminopropyltriethoxysilane, 3-aminopropyltrimethoxysilane, and 3-chloropropyltrimethoxysilane. The coupling agent may comprise from 0.1 to 20 volume percent (vol. %), from 0.1 to 15 vol. %, from 0.1 to 10 vol. %, from 0.1 to 5 vol. %, from 0.1 to 3 vol. %, from 0.1 to 1 vol. %, from 0.1 to 0.5 vol %, 0.1 to 20 vol. %, from 0.5 to 20 vol. %, from 0.5 to 15 vol. %, from 0.5 to 10 vol. %, from 0.5 to 5 vol. %, from 0.5 to 3 vol. %, from 0.5 to 1 vol. %, from 1 to 20 vol. %, from 1 to 15 vol. %, from 1 to 10 vol. %, from 1 to 5 vol. %, from 1 to 3 vol. %, from 3 to 20 vol. %, from 3 to 15 vol. %, from 3 to 10 vol. %, from 3 to 5 vol. %, from 5 to 20 vol. %, from 5 to 15 vol. %, from 5 to 10 vol. %, from 10 to 20 vol. %, from 10 to 15 vol. %, or from 15 to 20 vol. % γ-glycidoxypropyltriethoxysilane, γ-aminopropyltriethoxysilane, γ-(methacryloxy)propyltrimethoxysilane, 3-acrylamidopropyltrimethoxysilane, 4-aminobutryltriethoxysilane, p-aminophenyltrimethoxysilane, carboxyethylsilanetriol sodium, 4-bromobutyltrimethoxysilane, 2-(chloromethyl)allyltrimethoxysilane, hydroxymethyltriethoxysilane, 3-isocyanotopropyltrimethoxysilane, 3-mercaptopropyltrimethoxysilane, allyltrimethoxysilane, 3-glycidoxypropyltrimethoxysilane, 3-aminopropyltriethoxysilane, 3-aminopropyltrimethoxysilane, or 3-chloropropyltrimethoxysilane, and from 80 to 99.9 vol. %, from 80 to 99.5 vol. %, from 80 to 99 vol. %, from 80 to 95 vol. %, from 80 to 90 vol. %, from 80 to 85 vol. %, from 85 to 99.9 vol. %, from 85 to 99.5 vol. %, from 85 to 99 vol. %, from 85 to 95 vol. %, from 85 to 90 vol. %, from 90 to 99.9 vol. %, from 90 to 99.5 vol. %, from 90 to 99 vol. %, from 90 to 95 vol. %, 95 to 99.9 vol. %, from 95 to 99.5 vol. %, from 95 to 99 vol. %, from 99 to 99.9 vol. %, from 99 to 99.5 vol. %, from 99 to 99.9 vol. %, or from 99.5 to 99.9 vol. % deionized water. The nanoparticle proppant coating may comprise from 0.001 to 20 wt. %, from 0.001 to 15 wt. %, from 0.001 to 10 wt. %, from 0.001 to 5 wt. %, from 0.001 to 2 wt. %, from 0.001 to 1 wt. %, from 0.001 to 0.2 wt. %, from 0.001 to 0.05 wt. %, from 0.05 to 20 wt. %, from 0.05 to 15 wt. %, from 0.05 to 10 wt. %, from 0.05 to 5 wt. %, from 0.05 to 2 wt. %, from 0.05 to 1 wt. %, from 0.05 to 0.2 wt. %, from 0.2 to 20 wt. %, from 0.2 to 15 wt. %, from 0.2 to 10 wt. %, from 0.2 to 5 wt. %, from 0.2 to 2 wt. %, from 0.2 to 1 wt. %, from 1 to 20 wt. %, from 1 to 15 wt. %, from 1 to 10 wt. %, from 1 to 5 wt. %, from 1 to 2 wt. %, from 2 to 20 wt. %, from 2 to 15 wt. %, from 2 to 10 wt. %, from 2 to 5 wt. %, from 5 to 20 wt. %, from 5 to 15 wt. %, from 5 to 10 wt. %, from 10 to 20 wt. %, from 10 to 15 wt. %, or from 15 to 20 wt. % coupling agent as calculated by a weight of the unfunctionalized organic resin.

The nanoparticle proppant coating may further comprise a crosslinker. A crosslinker is a substance or agent that induces the subsurface formation of crosslinks. Mixing an unpolymerized or partially polymerized unfunctionalized organic resin with a crosslinker results in a chemical reaction that crosslinks the unfunctionalized organic resin. A crosslinked nanoparticle proppant coating may retain its shape without dissolving in the hydraulic fracturing fluid while maintaining a sufficient attraction or bond to the proppant particle. The degree of crosslinking may be controlled by the molar or weight ratio of crosslinker to monomer. In some embodiments, the crosslinker may comprise at least one of paraformaldehyde, hexamethylenetetramine, aliphatic diamine, aromatic diamines, polyamines, imidazoles, polyols, diols, isocynates, polyisocynates, acylperoxide, peroxyester, oxazolidines, melamine resins, aldehyde donors, or resole polymers and mixture thereof. The proppant may comprise from 8 to 20 wt. %, from 8 to 18 wt. %, from 8 to 15 wt. %, from 10 to 20 wt. %, from 10 to 18 wt. %, from 10 to 16 wt. %, from 10 to 15 wt. %, from 13 to 20 wt. %, from 13 to 18 wt. %, or from 13 to 15 wt. % crosslinker as calculated by a weight of the unfunctionalized organic resin.

In some embodiments, the nanoparticle proppant coating further includes a lubricating agent to reduce friction on the nanoparticle proppant coating. The lubricating agent may include at least one of calcium stearate or silicone oil. The nanoparticle proppant coating may comprise from 0.01 to 8 wt. %, from 0.01 to 3.75 wt. %, from 0.01 to 1.75 wt. %, from 0.25 to 8 wt. %, from 0.25 to 3.75 wt. %, from 0.25 to 1.75 wt. %, from 0.75 to 8 wt. %, from 0.75 to 3.75 wt. %, or from 0.75 to 1.75 wt. % lubricating agent as calculated by a weight of the unfunctionalized organic resin.

The nanoparticle proppant coating may further include an accelerating agent. The accelerating agent may include: hydrochloric acid; Lewis acid; boron trifluoride etherate; zinc or manganese ions; acetic acid; carboxylic acid; bases, such as sodium hydroxide; salts, such as zinc acetate; or combinations of these. The nanoparticle proppant coating may include from 1 to 70 wt. %, from 1 to 45 wt. %, from 1 to 20 wt. %, from 5 to 70 wt. %, from 5 to 45 wt. %, from 5 to 12 wt. %, from 12 to 70 wt. %, from 12 to 45 wt. %, from 12 to 20 wt. % accelerating agent as calculated by a weight of the proppant particles.

The nanoparticle proppant coating may further include, but is not limited to, coloring agents, fluorescent agents, ultraviolet (UV) absorbers, processing aids, mica, talc, nanofillers, silane coupling agents, antislip agents, water affinity or repulsion components, impact modifiers, anticaking agents, wetting agents, and toughening agents such as one or more block copolymers. The one skilled in art know how to use these additives and in the amount.

The nanoparticle coated proppant may be hydrophobic, oleophobic, or both. The degree of wettability of the nanoparticle proppant coating is adjusted so as to provide the wettability that is optimum for production of oil, gas and condensate and also prevents any water block formation. In some embodiments, the nanoparticle proppant coating may have hydrophobic tendencies, such as a lack of attraction to water, repulsion to water, or immiscibility in water. The nanoparticle proppant coating may not substantially dissolve (does not dissolve more than 10 wt. % or more than 8 wt. %, or more than 5 wt. % or more than 3 wt. %) when contacted with, submerged in, or otherwise exposed to water. In some embodiments, the nanoparticle proppant coating may not dissociate from the proppant particle when the nanoparticle coated proppant is added to a water-based fluid, such as water or a fluid that includes water. Dissolution of the nanoparticle proppant coating in a fluid medium may be determined by any suitable analytical technique for detection of solvated coating material that is performed on a fluid medium to which a nanoparticle coated proppant has been added and allowed to equilibrate at room temperature for at least 24 hours. The proppant may have a water contact angle of from 120° to 180°, of at least 70°, of at least 80°, of at least 90°, of at least 100°, of at least 110°, of at least 120°, of at least 150°, or of at least 180°. The contact angle may be measured in accordance with ASTM D7334-8(2013).

In some embodiments, the nanoparticle proppant coating may have oleophobic tendencies, such as a lack of attraction to hydrocarbons, repulsion to hydrocarbons, or immiscibility in hydrocarbons. The nanoparticle proppant coating may not substantially dissolve (does not dissolve more than 10 wt. % or more than 8 wt. %, or more than 5 wt. % or more than 3 wt. %) when contacted with, submerged in, or otherwise exposed to hydrocarbons. In some embodiments, the nanoparticle proppant coating may not dissociate from the proppant particle when the nanoparticle coated proppant is added to a hydrocarbon-based fluid, oil or gas. Dissolution of the nanoparticle proppant coating in a fluid medium may be determined by any suitable analytical technique for detection of solvated coating material that is performed on a fluid medium to which a nanoparticle coated proppant has been added and allowed to equilibrate at room temperature for at least 24 hours. The proppant may have a hydrocarbon contact angle of from 30° to 70°, of from 50° to 70°, of from 50° to 60°, of from 120° to 180°, of at least 70°, 80°, 90°, 100°, 110°, 120°, 150°, or of 180°. The proppant may have a hydrocarbon contact angle of from 30° to 70°, of from 50° to 70°, of from 50° to 60°, of from 120° to 180°, of at least 70°, 80°, 90°, 100°, 110°, 120°, 150°, or of 180°. In some embodiments, the proppant may have a hydrocarbon contact angle of 54° or 80°.

Referring again to FIG. 1, in one or more embodiments, the proppant particle 100 may be coated with a nanoparticle proppant coating 110 during a coating step 200 to produce, form, or result in a nanoparticle coated proppant. In some embodiments, the nanoparticle proppant coating 110 may be a surface layer on or bound to the proppant particle 100. Such a surface layer may coat at least a portion of the surface of the proppant particle 100. The nanoparticle proppant coating 110 may coat the entire surface of the proppant particle 100 (as shown) or, alternatively, may only partially surround the proppant particle 100 (not shown), leaving at least a portion of surface of the proppant particle 100 uncoated or otherwise exposed. Also not shown, the nanoparticle proppant coating 110 may be the outermost coating of the proppant particle with one or more other intervening coatings positioned between the nanoparticle proppant coating 110 and the proppant particle 100. This means that in such an embodiment the nanoparticle proppant coating 110 is coupled to the proppant particle 100 as opposed to contacting the proppant particle 100 as shown in FIG. 1.

Further embodiments of the present disclosure are directed to methods for producing nanoparticle coated proppants. The method may include reacting nanoparticles with at least one of alkoxysilanes or halosilanes. These alkoxysilanes or halosilanes may contain hydrophobic, oleophobic, or omniphobic groups to form the functionalized nanoparticles with low surface energy. The alkoxysilanes or halosilanes may include a fluorine-containing group, a perfluoro-containing group, an organic silicon containing group, a long chain linear or branched hydrocarbon containing group, an alkyl containing group, an aromatic containing group, or a combination thereof. These groups may be hydrophobic, oleophobic, or omniphobic groups. In some embodiment nanoparticles are also functionalized with coupling agent. The silane coupling compound reacts with the nanoparticles to form a bond, as previously described. The silane coupling compound may include at least one of, but is not limited to γ-glycidoxypropyltriethoxysilane, γ-aminopropyltriethoxysilane, γ-(methacryloxy)propyl trimethoxysilane, 3-acrylamidopropyltrimethoxysilane, 4-aminobutryltriethoxysilane, p-aminophenyltrimethoxysilane, carboxyethylsilanetriol sodium, 4-bromobutyltrimethoxysilane, 2-(chloromethyl)allyltrimethoxysilane, hydroxymethyltriethoxysilane, 3-isocyanotopropyltrimethoxysilane, 3-mercaptopropyltrimethoxysilane and allyltrimethoxysilane.

The silane coupling compound may further comprise a terminal binding group. Furthermore, the method may further include binding the nanoparticles to the unfunctionalized organic resin with a terminal binding group before coating the proppant particles. The terminal binding group may comprise at least one of an epoxy group, an amine group, methyacryloxy group, acrylamide group, aminophenyl group, carboxyl group, halogen group, hydroxyl group, isocynate group, mercapto group, allyl group or a silane ester group. The terminal group reacts with the unfunctionalized organic resin. The method then further comprises coating proppant particles with unfunctionalized organic resin, strengthening agent, and the functionalized nanoparticles to produce nanoparticle coated proppants with nanoparticle proppant coating.

The monomer in the fluorosilane solution may include perfluorooctyltriethoxysilane, perfluorooctyltrichlorosilane, nanofluorohexyltrichlorosilane, tridecafluoro-1,1,2,2-tetrahydrooctyltrichlorosilane, heptadecafluoro-1,1,2,2-tetrahydrodecyltrichlorosilane, 1H,1H,2H,2H-perfloorodecyltriethoxysilane, perfluorodecyltrichlorosilane, or combinations of these. The fluorosilane solution may include from 95 to 99% perfluorooctyltriethoxysilane. The fluorosilane solution may include at least one of fluoropolymers or fluoro oligomers. The fluorosilane solution may have a molecular weight of from 300 to 700 g/mol, from 300 to 600 g/mol, from 300 to 550 g/mol, from 300 to 500 g/mol, from 400 to 700 g/mol, from 400 to 600 g/mol, from 400 to 550 g/mol, from 400 to 500 g/mol, from 450 to 700 g/mol, from 450 to 600 g/mol, from 450 to 550 g/mol, from 450 to 500 g/mol, from 475 to 700 g/mol, from 475 to 600 g/mol, from 475 to 550 g/mol, from 475 to 525 g/mol, from 475 to 500 g/mol, from 500 to 700 g/mol, from 500 to 600 g/mol, from 500 to 550 g/mol, or from 500 to 525 g/mol. The fluorosilane solution may be 1H,1H,2H,2H-perfluorooctyltriethoxysilane, 97% (B24620 produced by Alfa Aesar®) and may have a molecular weight of 510.37 g/mol.

In some embodiments, the method may include mixing the strengthening agent, functionalized nanoparticles, and unfunctionalized organic resin into a mixture; and coating the proppant particles with the mixture. As stated previously, the strengthening agent and the functionalized nanoparticles may be uniformly distributed within the unfunctionalized organic resin. The method for producing a nanoparticle coated proppants may include coating the proppant particle using a two-layer coating or multi-layered coating system. The method may include coating the proppant particles with the unfunctionalized organic resin, mixing the strengthening agent and the functionalized nanoparticles to form a mixture, and coating the proppant particles with the mixture. In another embodiment, the proppant particles may be coated with the unfunctionalized organic resin prior to coating the proppant particles with the functionalized nanoparticles. As stated previously, in other embodiments, the nanoparticle proppant coating may include the unfunctionalized organic resin as a separate layer from functionalized nanoparticles, such as the functionalized nanoparticles arranged proximate an outer surface of the unfunctionalized organic resin. These layers may be of uniform thickness or may comprise changes in thickness throughout, leading to hierarchical roughness in the nanoparticle proppant coating. In some embodiments, the method may further include melting the unfunctionalized organic resin prior to the coating step, in the case of a solid unfunctionalized organic resin, such as novolac.

The method may further include coating the proppants with a coupling agent or a crosslinker. In some embodiments, the method further includes employing a lubricating agent or an accelerating agent. In other embodiments, the method includes coating proppant particles with a top coating. The top coating may be an overlying layer that may be added for additional properties or features. As a non-limiting example, additional coatings may be used in conjunction with, or may comprise, a breaker. The breaker may be released from the proppant coating into the hydraulic fracturing fluid or drilling fluid. As used throughout this disclosure, a "breaker" refers to a compound that may decrease the viscosity of the hydraulic fracturing fluid or drilling fluid after a fracturing operation to prevent subsurface formation damage. In some embodiments, the breaker may be an oxidizer or enzyme breaker. The breaker may be any suitable material capable of reducing the viscosity of a fluid by breaking long-chain molecules into shorter segments.

The method for producing a nanoparticle coated proppants may include heating the proppant particles up to from 370° F. to 425° F., up to 100° F., up to 200° F., up to 300° F., up to 350° F., up to 370° F., up to 400° F., up to 425° F., up to 450° F., or up to 500° F. prior to the coating step. The heating may include calcining by any suitable process such as by rotary kiln, flame heating, electric heating, forced hot air heating, convection, friction, conduction, combustion, exothermic reactions, microwave heating, or infrared radiation, for example.

In some embodiments, the method may further comprise roughening the proppant particles before the coating step. The proppant particles may be chemically or physically roughened, as previously described.

In some embodiments, the coating step may include contacting the proppant particles with the mixture in a fluidized bed process. In some embodiments, the coating step may include a stationary, bubbling, circulation, or vibratory fluidized bed process. In some embodiments, the coating step may include spraying or saturating the proppant particles with the mixture. The coating step may include, in some embodiments, tumbling or agitating the nanoparticle coated proppants in a drum coater, a muller or a mixer with pedals to prevent agglomeration or clumping. The coating step may include adding another compound to the mixture, such as a solvent, an initiator, an adhesion promoter, or an additive, to form the nanoparticle proppant coating. In some embodiments, the coating process may be conducted with an emulsion coating technique. In some embodiments, the adhesion promoter may comprise a silane (for example, amino silane) or a silane-containing monomer. In some embodiments, an adhesion promoter may not be necessary to coat the proppant particles.

In some embodiments, the functionalized nanoparticles are mixed in the unfunctionalized organic resin and coated on to the proppant particles using known methods. In other embodiment, the functionalized particles are added to the coating processes in such a way to form a coating layer on top of the unfunctionalized organic resin. This can be achieved by adding the functionalized nanoparticles at the end of the coating cycle and immediately before adding any lubricating agent.

A method of preparing nanoparticle coated proppants with hierarchical roughness is also disclosed. In one embodiment, the method includes homogeneously mixing from 1 to 5 wt. % unfunctionalized organic resin as calculated by a weight of the proppant particles with from 0.1 to 10 wt. % functionalized nanoparticles as calculated by a weight of the unfunctionalized organic resin, from 0.1 to 10 wt. % strengthening agent or reinforcing agent as calculated by a weight of the unfunctionalized organic resin, and other additives in a molten or liquid state for from 10-30 minutes to form a resin mixture. The method further comprises heating proppant particles to from 100° F. to 450° F. and transferring the proppant particles to a mixer, mixing the proppant particles with from 1 to 5 wt. % resin mixture as calculated by a weight of the proppant particles to coat the proppant particles, and adding from 0.1 to 2.0 wt. % coupling agent as calculated by a weight of the unfunctionalized organic resin to form a bond between the proppant particles and the unfunctionalized organic resin. The method further comprises mixing for 30-60 seconds to coat the proppant particles uniformly with the unfunctionalized organic resin, adding from 0.1 to 20 wt. % curing agent/crosslinker with respect to unfunctionalized resin to cure the coating, and mixing for from 30 to 90 seconds. The curing agent may include at least one of, but is not limited to, paraformaldehyde, hexamethylene tetramine, aliphatic diamine, aromatic di amines, polyamines, imidazoles, polyols, diols, isocynates, polyisocynates, acylperoxide, peroxyester, oxazolidines, melamine resins, aldehyde donors, or resole polymers and combinations thereof. The method may further include adding from 0.5 to 8.0 wt. % lubricating agent as calculated by a weight of the unfunctionalized organic resin and mixing for 20 to 30 seconds, and cooling down the proppants with air or spraying water and discharge. In some embodiments, the lubricating agent is chosen from the group consisting of silicone oil, stearic acid, polyethylene wax, and combinations thereof. In other embodiments, the lubricating agent may comprise at least one of silicone oil, stearic acid, polyethylene wax, and combinations thereof.

In another embodiment, the method of preparing the nanoparticle coated proppants includes heating proppant particles to from 100° F. to 450° F. and transferring the proppant particles to a mixer, then adding from 1 to 5 wt. % unfunctionalized organic resin as calculated by a weight of the proppant particles to the proppant particles and mixing for 20-60 seconds, then adding from 0.1 to 2.0 wt. % coupling agent as calculated by a weight of the unfunctionalized organic resin and mixing for from 10 to 20 seconds, then adding from 0.1 to 20 wt. % functionalized nanoparticles as calculated by a weight of the unfunctionalized organic resin and other additives and mixing for 30 to 90 seconds to coat the proppant particles uniformly with the nanoparticle proppant coating, thereby forming the nanoparticle coated proppant. The method may further comprise then adding from 0.1 to 20 wt. % curing agent as calculated by a weight of the unfunctionalized organic resin, thereby curing the nanoparticle proppant coating. The method may further comprise mixing for from 30 to 90 seconds and adding from 0.5 to 8.0 wt. % lubricating agent as calculated by a weight of the unfunctionalized organic resin and stirring for from 20 to 30 seconds. Lastly, the method may further include cooling the nanoparticle coated proppants with air or spraying water and discharge.

In another embodiment, the method of preparing the nanoparticle coated proppants includes heating proppant particles to from 100° F. to 450° F. and transferring the proppant particles to a mixer, then adding from 1 to 5 wt. % unfunctionalized organic resin as calculated by a weight of the proppant particles to the proppant particles and mixing for 20-60 seconds, then adding from 0.1 to 2.0 wt. % coupling agent as calculated by a weight of the unfunctionalized organic resin and mixing for from 10 to 20 seconds, then adding a strengthening agent and other additives and mixing for from 30 to 90 seconds to uniformly coat the proppant particles, then adding from 0.1 to 20 wt. % curing agent as calculated by a weight of the unfunctionalized organic resin, thereby partially or fully curing the coating, and mixing for from 10 to 30 seconds, then adding functionalized nanoparticles on the partially or fully cured coating to form hierarchical roughness, thereby forming the nanoparticle proppant coating. The method may further include adding from 0.5 to 8.0 wt. % lubricating agent as calculated by a weight of the unfunctionalized organic resin, stirring for from 20 to 30 seconds, and cooling the nanoparticle coated proppants with air or spraying water and discharge.

A hydraulic fracturing fluid and a method for increasing a rate of hydrocarbon production from a subsurface formation is also disclosed. A hydraulic fracturing fluid may be used to propagate fractures within a subsurface formation and further open fractures. The hydraulic fracturing fluid may include water, a clay-based component, and the nanoparticle coated proppants disclosed in this disclosure. The clay-based component may include one or more components selected from the group consisting of lime (CaO), $CaCO_3$, bentonite, montmorillonite clay, barium sulfate (barite), hematite ($Fe_2O_3$), mullite ($3Al_2O_3.2SiO_2$ or $2Al_2O_3.SiO_2$), kaolin, ($Al_2Si_2O_5(OH)_4$ or kaolinite), alumina ($Al_2O_3$, or aluminum oxide), silicon carbide, tungsten carbide, and combinations thereof. The nanoparticle coated proppants within the hydraulic fracturing fluid may aid in treating subsurface fractures, to prop open and keep open the fracture. The method may include producing a first rate of production of hydrocarbons from the subsurface formation, in which the hydrocarbons comprise a first interfacial tension, introducing a hydraulic fracturing fluid comprising the nanoparticle coated proppants into the subsurface formation, in which the proppants reduce the first interfacial tension of the hydrocarbons to a second interfacial tension, thereby reducing condensate banking or water blockage near a wellbore, and increasing hydrocarbon production from the subsurface formation by producing a second rate of production of hydrocarbons from the subsurface formation, in which the second rate of production of hydrocarbons is greater than the first rate of production of hydrocarbons.

The hydraulic fracturing fluid in the subsurface fracture may comprise nanoparticle coated proppants suspended in the hydraulic fracturing fluid. In some embodiments, the nanoparticle coated proppants may be distributed throughout the hydraulic fracturing fluid. The nanoparticle coated proppants may not aggregate or otherwise coalesce within the subsurface formation, owing in part to the wettability characteristics of the nanoparticle proppant coating. The hydraulic fracturing fluid may be pumped into the subsurface formation or may be otherwise contacted with the subsurface formation.

Embodiments of methods of treating a subsurface formation may include propagating at least one subsurface fracture in the subsurface formation to treat the subsurface formation. In some embodiments, the subsurface formation may be a rock or shale subsurface formation. In some embodiments, contacting of the subsurface formation may include drilling into the subsurface formation and subsequently injecting the hydraulic fracturing fluid into at least one subsurface fracture in the subsurface formation. In some embodiments, the hydraulic fracturing fluid may be pressurized before being injected into the subsurface fracture in the subsurface formation.

EXAMPLES

The following examples illustrate features of the present disclosure but are not intended to limit the scope of the disclosure.

Example 1: Making of Silica Nanoparticles

Various sized (2 nm to 400 nm diameter) silica nanoparticles were synthesized using the Stöber process. The modified Stöber process may also be used. The Stöber process is a chemical process used to prepare silica particles of controllable and uniform size. The method involves the addition of tetraethyl orthosilicate (TEOS), or other silicates, in a mixture of water, alcohol, and ammonia. The mixture was agitated to form particles. The size of the particles depended on the concentration of solvents and silicate additives. The particles formed by the agitation were then centrifuged, washed with water and alcohol four times, and dried in an oven at 150° C. for 5 hours. The size distribution of the silica nanoparticles was then measured by dynamic light scattering. The diameter of the silica nanoparticles was measured to range from 110 nm to 400 nm.

Example 2

In this experiment, fluorinated silica nanoparticles were formed by addition of 100 microLiter (μL) of 1H,1H,2H,2H-perfluorooctyltriethoxysilane, 97% (B24620 produced by Alfa Aesar®, with a molecular weight of 510.37 g/mol) to 20 milliLiter (mL) of the silica nanoparticle solution suspended in ethanol. The resulting mixture was then stirred for 8 hours at room temperature. The modified nanoparticles were then washed, twice, by centrifugation at 9000 revolutions per minute (RPM) for 20 minutes and re-suspended in ethanol.

Example 3

In this experiment, mixed epoxy and fluorinated functionalized silica nanoparticles were formed by addition of 1004 of 1H,1H,2H,2H-perfluorooctyltriethoxysilane, 97% (B24620 produced by Alfa Aesar®, with a molecular weight of 510.37 g/mol) and 20 μL of r-glycidoxypropyl-trimethoxysilane to 20 mL of the silica nanoparticle solution suspended in ethanol. The resulting mixture was then stirred for 8 hours at room temperature. The modified nanoparticles were then washed, twice, by centrifugation at 9000 RPM for 20 minutes and re-suspended in ethanol.

Example 4

An example coating recipe at a target mixing temperature of 400° F., in which the functionalized nanoparticles are added after the unfunctionalized organic resin and cross-linker, is described in Table 1. The functionalized nanoparticles are added when the nanoparticle proppant coating is still not fully cured so that particles can react and embed in coating to form the uneven surface morphology.

TABLE 1

| Steps to achieve nanoparticle coated proppants. |
| --- |
| Coating Steps |
| 1 Preheat 150 grams (g) of sand in a beaker to 450° F. |
| 2 Add 0.1-2.0 wt. % coupling agent with respect to unfunctionalized resin weight and mix for 10 seconds (sec.). |
| 3 Add 2-5 wt. % of novolac unfunctionalized organic resin with respect to sand and mix with stirrer for 2 minutes. |
| 4 Add 10-16 wt. % of hexamethylenetetramine with respect to novolac unfunctionalized organic resin in the beaker and continue mixing for about 1 minutes. |

TABLE 1-continued

Steps to achieve nanoparticle coated proppants.

Coating Steps

5 Add 0.1-5 wt. % of mixed epoxy-fluorinated functionalized silica nanoparticles with respect to unfunctionalized resin prior to fully curing the resin and continue mixing for another 1 to 2 minutes.
6 Add 0.2 to 5 wt. % lubricating agent with respect to resin and stir for an additional 20 sec.
7 Cool by adding small amount of water followed by discharging the coated sand in the pan.

Example 5

Another example coating recipe at a target mixing temperature of 400° F., in which the functionalized nanoparticles are added with the unfunctionalized organic resin and before the crosslinker, is described in Table 2.

TABLE 2

Steps to achieve a nanoparticle coated proppant.

Coating Steps

1 Preheat 150 g of sand in a beaker to 450° F.
2 Add 0.1-2.0 wt. % coupling agent with respect to unfunctionalized resin weight and mix for 10 sec.
3 Add 2-5 wt. % of novolac unfunctionalized organic resin and 1-30 wt. % of mixed epoxy-fluorinated functionalized silica nanoparticles with respect to resin and mix with stirrer for 2 minutes.
4 Add 10-16 wt. % of hexamethylenetetramine with respect to novolac unfunctionalized organic resin in the beaker and continue mixing for about 2 to 5 minutes for nanoparticle proppant coating to harden.
5 Add 0.2 to 5 wt. % lubricating agent with respect to resin stir for additional 20 sec.
6 Cool by adding small amount of water followed by discharging the coated sand in the pan.

It should be apparent to those skilled in the art that various modifications and variations may be made to the embodiments described within without departing from the spirit and scope of the claimed subject matter. Thus, it is intended that the specification cover the modifications and variations of the various embodiments described within provided such modification and variations come within the scope of the appended claims and their equivalents.

Having described the subject matter of the present disclosure in detail and by reference to specific embodiments thereof, it is noted that the various details disclosed within should not be taken to imply that these details relate to elements that are essential components of the various embodiments described within, even in cases where a particular element is illustrated in each of the drawings that accompany the present description. Further, it should be apparent that modifications and variations are possible without departing from the scope of the present disclosure, including, but not limited to, embodiments defined in the appended claims. More specifically, although some aspects of the present disclosure are identified as particularly advantageous, it is contemplated that the present disclosure is not necessarily limited to these aspects.

What is claimed is:

1. A method for producing nanoparticle coated proppant with a nanoparticle proppant coating, the method comprising:

reacting nanoparticles with at least one of an alkoxysilane solution or a halosilane solution to form functionalized nanoparticles, in which the functionalized nanoparticles comprise nanoparticles having at least one attached omniphobic moiety, the at least one attached omniphobic moiety comprising at least a fluoroalkyl-containing group comprising 1H, 1H, 2H, 2H-perfluorooctylsilane; and coating proppant particles with unfunctionalized organic resin, a strengthening agent comprising at least one of carbon nanotubes, silica, alumina, mica, nanoclay, graphene, boron nitride nanotubes, vanadium pentoxide, zinc oxide, calcium carbonate, or zirconium oxide, and the functionalized nanoparticles to produce the nanoparticle coated proppant with the nanoparticle proppant coating.

2. The method of claim 1, in which the at least one attached omniphobic moiety further comprises organosilicon.

3. The method of claim 1, in which the unfunctionalized organic resin, strengthening agent, and functionalized nanoparticles are mixed, and then the mixture is coated onto the proppant particles.

4. The method of claim 1, in which the proppant particles are coated with unfunctionalized organic resin prior to coating the proppant particles with the functionalized nanoparticles.

5. The method of claim 1, further comprising adding a coupling agent to bind the nanoparticles to the unfunctionalized organic resin with a terminal binding group before coating the proppant particles.

6. The method of claim 1, in which the terminal binding group comprises at least one of an epoxy group, an amine group, a methyacryloxy group, an acryloxy group, an acrylamide group, an aminophenyl group, a carboxyl group, a halogen group, a hydroxyl group, an isocynate group, a mercapto group, an allyl group, or a silane ester group.

7. The method of claim 1, further comprising heating the proppant particles up to from 370° F. to 425° F. before coating the proppant particles.

8. The method of claim 1, in which the halosilane solution comprises at least one of perfluorooctyltriethoxysilane, perfluorooctyltrichlorosilane, nanofluorohexyltrichlorosilane, tridecafluoro-1,1,2,2-tetrahydrooctyltrichlorosilane, heptadecafluoro-1,1,2,2-tetrahydrodecyltrichlorosilane, 1H,1H, 2H,2H-perfluorodecyltriethoxysilane, or perfluorodecyltrichlorosilane.

9. The method of claim 1, in which the alkoxysilane solution comprises at least one of glycidoxypropyltrimethoxysilane, aminopropyltriethoxysilane, (methacryloxy)propyltrimethoxysilane, 3-acrylamidopropyltrimethoxysilane, 4-aminobutryltriethoxysilane, aminophenyltrimethoxysilane, carboxyethylsilanetriol sodium, 4 bromobutyltrimethoxysilane, 2-(chloromethyl)allyltrimethoxysilane, hydroxymethyltriethoxysilane, 3-isocyanotopropyltrimethoxysilane, 3-mercaptopropyltrimethoxysilane, or allyltrimethoxysilane.

10. The method of claim 1, in which the functionalized nanoparticles comprise at least one of nanosilica, nanoalumina, nanozinc oxide, nanotubes, carbon nanotubes, nanocalcium carbonate, mica, vanadium pentoxide, boron nitride nanotubes, nanozirconium oxide, nanotitanium oxide, nano clay, nanobarium oxide, or nanoboron oxide.

11. The method of claim 1, in which the functionalized nanoparticles comprise nanosilica.

12. The method of claim 1, in which the unfunctionalized organic resin comprises at least one of phenolic resin, epoxy resin, furan resin, polyurethane resin, polyurea resin, polyester, polyamide-imide resin, polyamide resin, urea-formaldehyde resin, melamine resin, silicone resin, or vinyl ester resin.

13. The method of claim 1, in which the unfunctionalized organic resin comprises phenol-formaldehyde.

14. The method of claim 1, in which the nanoparticle proppant coating further comprises at least one of a coupling agent, a crosslinker, or a lubricating agent.

15. The method of claim 1, in which the functionalized nanoparticles comprise a particle size of from 2 to 500 nm.

16. The method of claim 1, in which the strengthening agent comprises carbon nanotubes.

17. The method of claim 1, in which the nanoparticle coated proppant has at least one of a water contact angle of from 70° to 180° or an oil contact angle of from 30° to 180°.

18. The method of claim 1, in which the nanoparticle proppant coating comprises strengthening agent and functionalized nanoparticles uniformly distributed within the unfunctionalized organic resin.

19. The method of claim 1, in which the unfunctionalized organic resin is a separate layer from the functionalized nanoparticles.

20. A method for increasing a rate of hydrocarbon production from a subsurface formation, the method comprising:

producing a first rate of production of hydrocarbons from the subsurface formation through a wellbore, in which the hydrocarbons comprise a first interfacial tension;

introducing a hydraulic fracturing fluid comprising the nanoparticle coated proppant of claim 1 into the subsurface formation, in which the nanoparticle coated proppant reduce the first interfacial tension of the hydrocarbons to a second interfacial tension, thereby reducing at least one of condensate banking or water blockage near the wellbore; and increasing hydrocarbon production from the subsurface formation by producing a second rate of production of hydrocarbons from the subsurface formation, in which the second rate of production of hydrocarbons is greater than the first rate of production of hydrocarbons.

* * * * *